Sept. 13, 1955    W. L. WELLS    2,717,533
PHOTOFLASH CARTRIDGE EJECTORS
Filed June 7, 1951    2 Sheets-Sheet 1
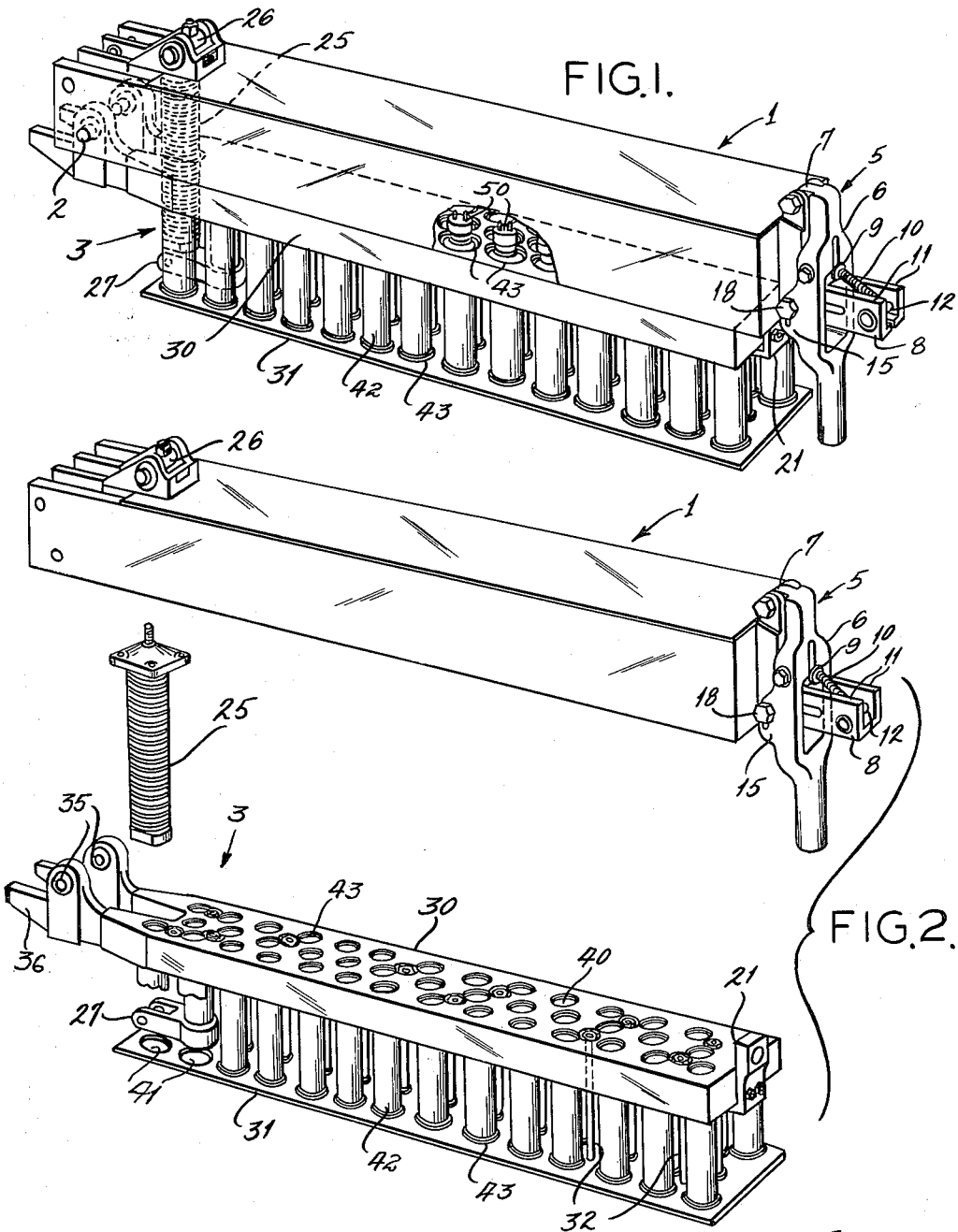
INVENTOR:
WILLIS L. WELLS
By Brunenga and Sutherland
ATTORNEYS.

Sept. 13, 1955 — W. L. WELLS — 2,717,533
PHOTOFLASH CARTRIDGE EJECTORS
Filed June 7, 1951 — 2 Sheets-Sheet 2
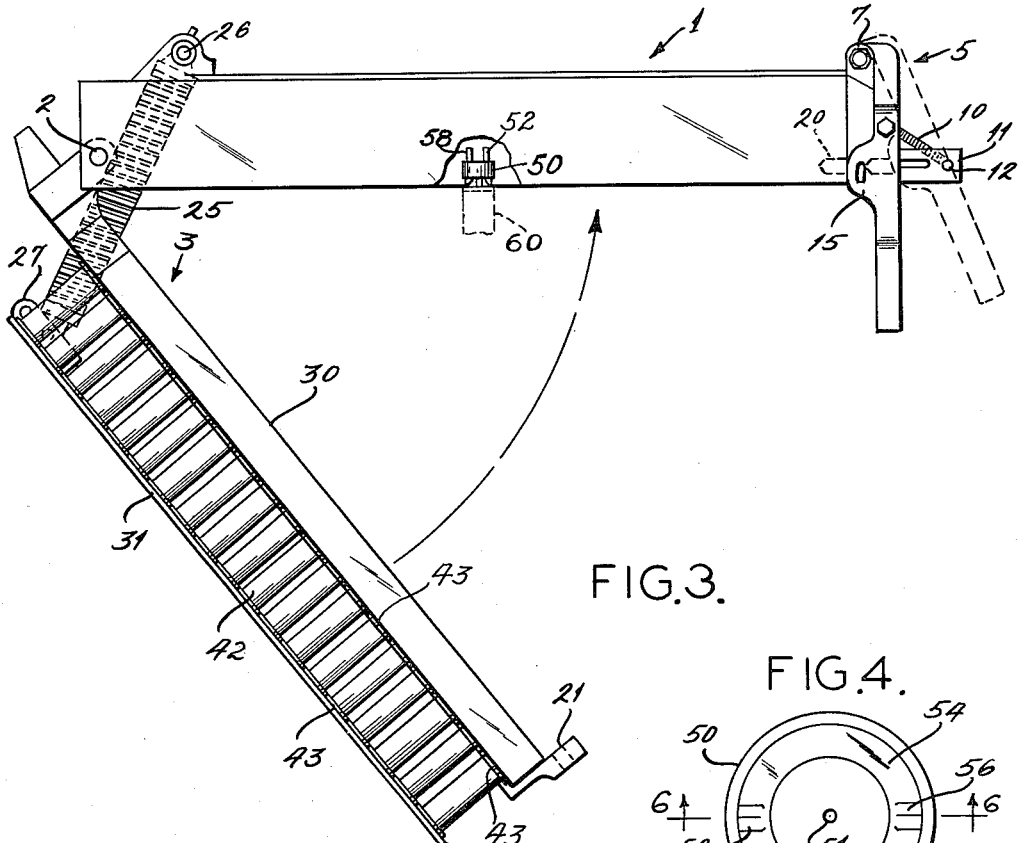
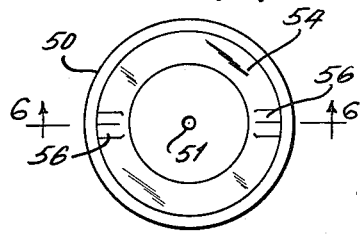
INVENTOR:
WILLIS L. WELLS
By Brunenga and Sutherland
ATTORNEYS.

ively 2,717,533
PHOTOFLASH CARTRIDGE EJECTORS

Willis L. Wells, Clayton, Mo.

Application June 7, 1951, Serial No. 230,410

1 Claim. (Cl. 89—1.5)

This invention relates to photoflash cartridge ejectors.

In modern aerial reconnaissance it is not only desirable but often necessary to make photographic surveys at night. To illuminate the area to be charted, photoflash cartridges are used. In order to minimize the weight of the cartridges and to utilize their light-producing ability fully, it is desirable to use a relatively small cartridge producing a light of high intensity for a brief period. It can be seen that in order to accomplish this object it is necessary to synchronize the ejection of the cartridge with the operation of the cameras. Furthermore, it is often desirable to eject cartridges consecutively, but, at the same time, depending upon the amount of illumination required, it may be desired to eject groups of cartridges rather than successive single cartridges.

In order to provide for the selective ejection of individual cartridges, of groups of cartridges, or all of the cartridges at once, it is necessary to provide a complicated electrical system, since, as has been pointed out, the ejection must be tied in with the operation of a camera. In most modern aircraft and especially in modern high-speed reconnaissance craft, which may be jet propelled, space within the craft is very limited and manual manipulation of apparatus within the craft itself is undesirable even when the craft is at rest.

One of the objects of this invention is to provide a photoflash cartridge ejector which can be loaded and unloaded from outside the plane to which it is attached. Another object is to provide such a photoflash cartridge ejector with improved firing mechanism. Other objects will become apparent to those skilled in the art in the light of the following description and accompanying drawing.

In accordance with this invention, generally stated, a photoflash cartridge ejector is provided with a cartridge holding rack and a breech block or casing containing electrical firing equipment including cartridge firing electric contact plugs mounted in the bottom of the casing. The rack is hinged to swing down beneath the casing and away from the firing plugs so as to allow cartridges to be inserted therein and removed therefrom without disturbing the electrical control system and to swing free of the interior of the aircraft to which the ejector is attached. The firing plug contacts through which the cartridges in the rack are fired are of such construction as to insure electrical connection when the rack of this invention, with its cartridges, is swung into closed position.

In the drawings:

Figure 1 is a view in perspective of one embodiment of this invention;

Figure 2 is another view in perspective of the embodiment of this invention shown in Figure 1;

Figure 3 is a view in side elevation, partly broken away, of the embodiment of this invention shown in Figure 1;

Figure 4 is a plan view of one embodiment of contact plug;

Figure 5 is a view in perspective of the contact plug shown in Figure 4; and

Figure 6 is a view in cross-section taken along the line 6—6 of Figure 4.

Referring now to the drawing, and especially to Figures 1, 2, and 3 for an illustrative embodiment of this invention, 1 represents a casing containing electrical control apparatus for a photoflash ejector. Mounted near one end of the casing 1 are a pair of pintles 2 supporting a cartridge-holding rack 3. At the other end of the casing 1 is a latch 5. The latch 5 is provided with a handle 6, hinged on the casing 1 at 7. The handle 6 is cut out to fit loosely around a bracket 8 which is secured to the casing 1 and has a pair of arms 11. The handle 6 is slotted above its cut-out portion to take a spring-biased bar 9. The spring 10 surrounding the bar 9 is supported by a pin 12 carried by the bracket arms 11. The handle 6 is provided with a pair of ears 15 having vertical slots therein. The bracket 8 is slotted horizontally and a bolt 18, carried by the ears 15, slides within those horizontal slots. Mounted on the bolt 18 intermediate the arms 11 of the bracket 8 is a keeper 20 journalled within the bracket 8 and taking into a block 21 carried by the cartridge-holding rack 3. A heavy spring 25 pivotally secured at 26 to the casing 1 at one of its ends and to the rack 3 at 27 at its other end, serves as a counter-balance against the weight of the rack 3. A hydraulic check, not here shown, may be provided in connection with the spring 25 to prevent the rack 3's snapping shut when it is closed and to prevent its dropping too rapidly when it is swung open. In the embodiment shown the rack 3 comprises an upper plate 30 and a lower plate 31 connected by tie-rods 32. One end of the upper plate 30 carries a pair of bearings 35 by which the rack 3 is mounted on the pintles 2. A pair of stops 36 extend beyond the bearings 35. At its other end the top plate 30 carries the block 21. The upper plate 30 is provided with a series of holes 40. The lower plate 31 is provided with holes 41 aligned with holes 40 in the upper plate 30. Extending between the holes 40 in the upper plate 30 and the holes 41 in the lower plate 31 are barrels 42. The barrels 42 are provided with flanges 43 which serve to space the upper and lower plates. At their upper ends the barrels are counter-bored to provide a seat 43 for the rims of the cartridges.

Mounted in the bottom of the casing 1 in such a position as to correspond with and to be aligned with each of the holes 40 in the upper plate 30 of the rack 3 when the rack is closed are contact plugs 50. In the embodiment shown in Figures 4, 5, and 6 a firing contact 51 extends through the center of the bottom of the contact plug. The firing contact 51 is connected electrically to a terminal 52 and is biased outwardly by a spring 53. A ring 54 supported by springs 55 carries a pair of grounding wedges 56. The ring 54 is separated from the firing contact 51 by insulating material and is connected electrically to another terminal 58. The contact plugs 50 are so mounted as to permit their firing contacts 51 and grounding wedges 56 to extend beyond the casing 1 to engage the cartridges fitted in the rack 3 when that rack is swung closed. The way in which the firing contacts 51 and grounding wedges 56 engage the head of a cartridge 60 is shown in Figure 3. The cartridges are so constructed as to present concentric conducting areas corresponding to the firing pin and grounding wedges of the contact plugs. The concentric areas of the cartridge are also insulated from one another at the cartridge head and are connected through the detonator of the cartridge. The provision of the sharp edged grounding wedges assures a properly closed circuit when the cartridges are fired. The terminals 52 and 58 are connected to the proper wires of the electrical system.

In operation the ejector is mounted with the casing 1 secured to or within the body of an airplane. In either event the rack 3 is mounted with respect to the plane in such a way that it can swing down free of the plane to be loaded and unloaded. Assume now that the rack is empty, and closed. The handle 6 is drawn away from the casing 1 against the force of the spring 10 to retract the keeper 20 from the block 21. When the keeper 20 clears that block the rack 3 swings down about the pintles 2 against the counter-balancing force of the spring 25. The cartridges can now easily be slipped into the barrels 42. The rims of the cartridges fit within the counter-bored seats 43. The rack is then simply swung closed while the handle 6 is held back; the handle 6 is released to permit the keeper 20 to take into the block 21; and the ejector is loaded and ready for firing. The heads of the cartridges come into engagement with the firing pins and grounding wedges of the contact plugs 50 as the rack is swung shut. It can be seen that the spring loading of the firing contacts 51 and the grounding wedges 56 permits a certain latitude in the clearance between the cartridge heads and the bottom of the casing 1. Furthermore the difficulties that would attend the grounding of the entire rack 3, arising from the cartridges' being coated with lacquer or from an accumulation of dirt on the cartridges or within the rack, are eliminated by the use of the grounding wedges 56.

It is a simple matter to remove the cartridges from the rack 3. The rack is swung down and the cartridges may either be pushed out manually or may be blown out with an air hose. It would, of course, be inadvisable to use the latter method if the cartridges or some of them are unejected.

Numerous variations in the construction of the elements of this invention within the scope of the appended claim will be apparent to those skilled in the art in the light of the foregoing disclosure. The latch mechanism may be varied, for example, as may the particular type of hinge structure by which the cartridge-carrying rack is mounted on the casing. The rack may also be pivoted along one side instead of at its end. In the contact plug, the grounding wedges may take a form different from that shown, and may, for example, resemble the firing pin. The function of the grounding wedges and firing pin may be reversed, if desired. The grounding wedges may be separately mounted, or a single grounding wedge may be used.

Thus it can be seen that a photoflash cartridge ejector is provided which is quickly and easily loaded and unloaded from outside the aircraft to which it is attached and at the same time insures proper electrical contact with the cartridge for firing.

Having thus described the invention, what is claimed and desired to be secured by Letters Patent is:

In an aircraft photoflash cartridge ejector of the type in which a multiplicity of cartridges are carried for selective ejection, the improvement which comprises a casing, cartridge firing means mounted within said casing, and a rack, constructed to carry said cartridges, pivotally mounted at one end on said casing, and provided with latching means complementary to latching means on said casing, said rack being constructed to bring the head of each cartridge into operative engagement with said firing means when said rack is swung into latching engagement with said casing and adapted to swing outside an aircraft on which said ejector is mounted when said latching means are not in engagement.

References Cited in the file of this patent

UNITED STATES PATENTS

| Number | Name | Date |
|---|---|---|
| 365,842 | Monfort | July 5, 1887 |
| 917,548 | Conway | Apr. 6, 1909 |
| 1,183,644 | Hill | May 16, 1916 |
| 1,190,070 | Abraham | July 4, 1916 |
| 1,377,292 | Thomas | May 10, 1921 |
| 1,581,521 | Snyder et al. | Apr. 20, 1926 |
| 1,720,619 | Baldwin | July 9, 1929 |
| 1,736,516 | Bailey et al. | Nov. 19, 1929 |
| 1,937,191 | Driggs | Nov. 28, 1933 |
| 1,937,220 | Driggs | Nov. 28, 1933 |
| 2,005,913 | Coffman | June 25, 1935 |
| 2,019,652 | Brookley | Nov. 5, 1935 |
| 2,279,692 | Marten-Gwilliam | Apr. 14, 1942 |
| 2,462,135 | Skinner | Feb. 22, 1949 |
| 2,477,901 | Robboy | Aug. 2, 1949 |

FOREIGN PATENTS

| Number | Country | Date |
|---|---|---|
| 707,515 | France | July 9, 1931 |
| 517,732 | Great Britain | Feb. 7, 1940 |
| 954,794 | France | Dec. 30, 1949 |